Dec. 18, 1956  T C. NOON ET AL.  2,774,629
VARIABLE AREA FUEL NOZZLES
Filed Sept. 8, 1950  4 Sheets-Sheet 1

Inventors
T Cyril Noon
Frank C. Bayer
Attys

Dec. 18, 1956  T C. NOON ET AL  2,774,629
VARIABLE AREA FUEL NOZZLES
Filed Sept. 8, 1950  4 Sheets-Sheet 2
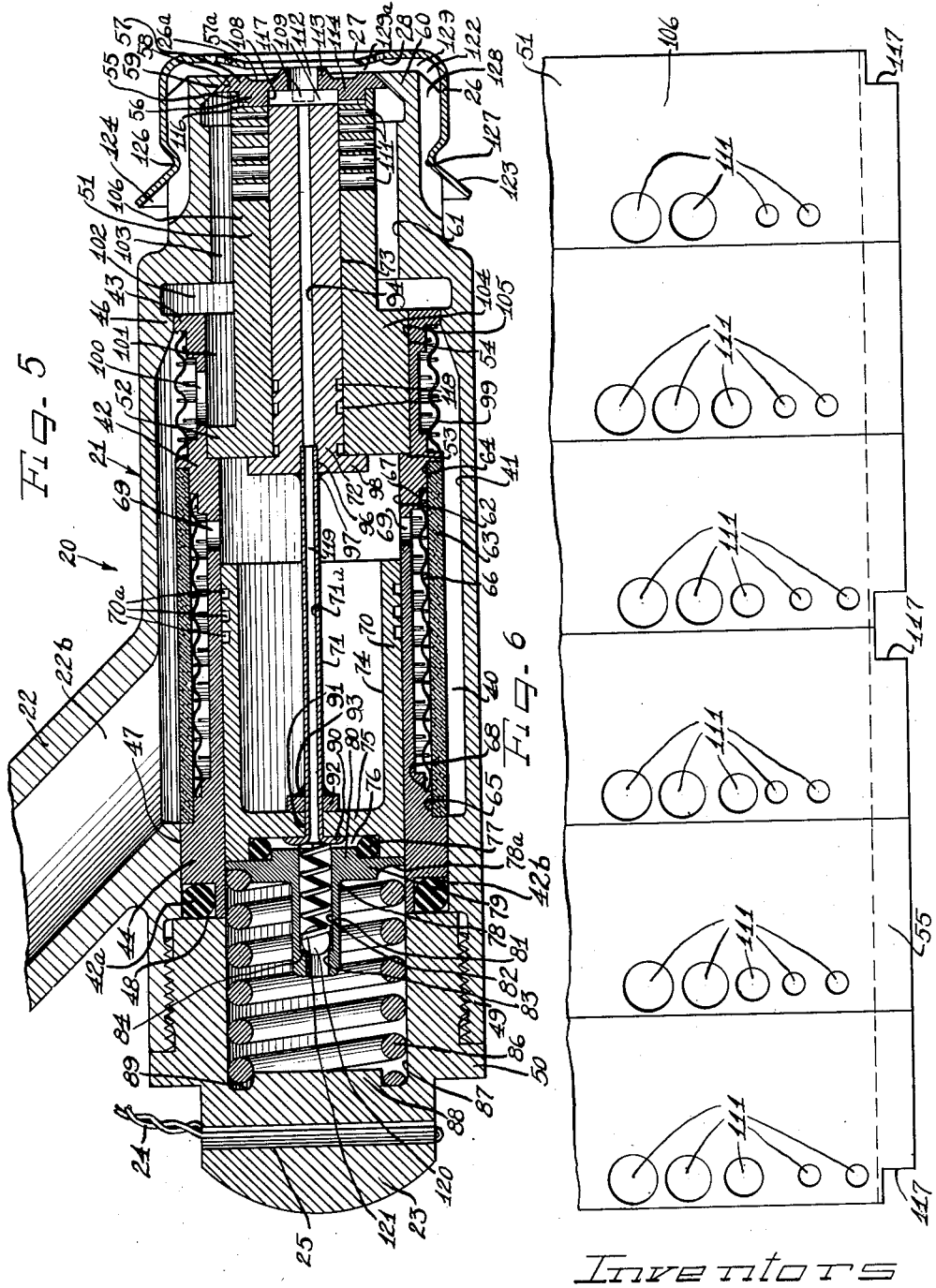
Inventors
T Cyril Noon
Frank C. Bayer

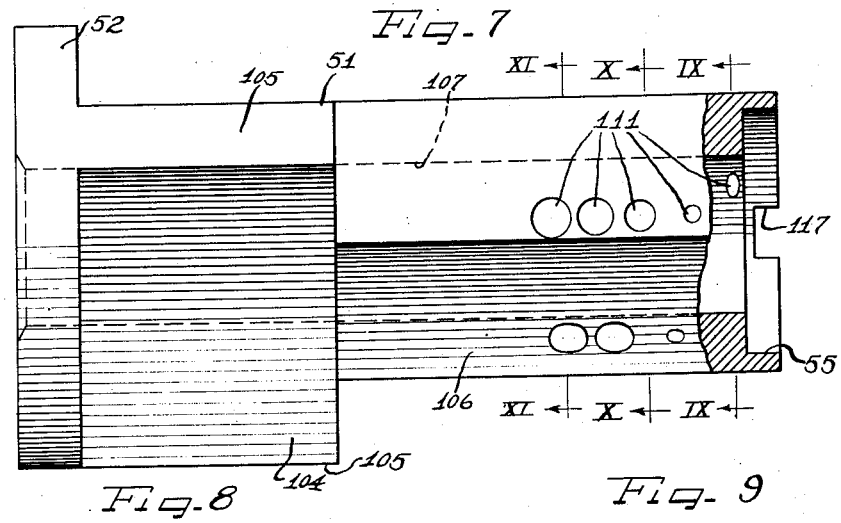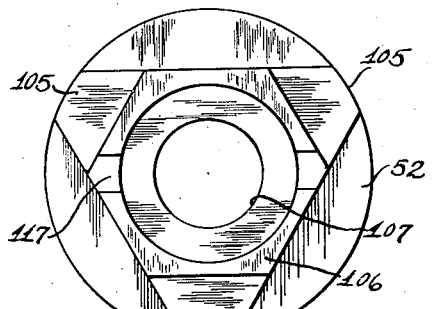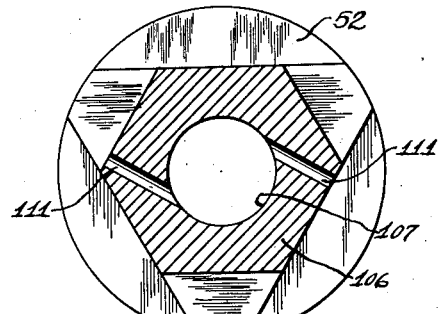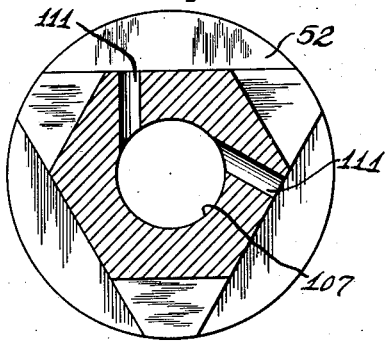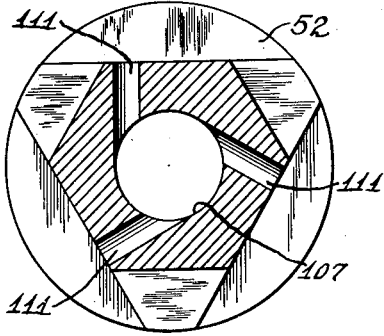

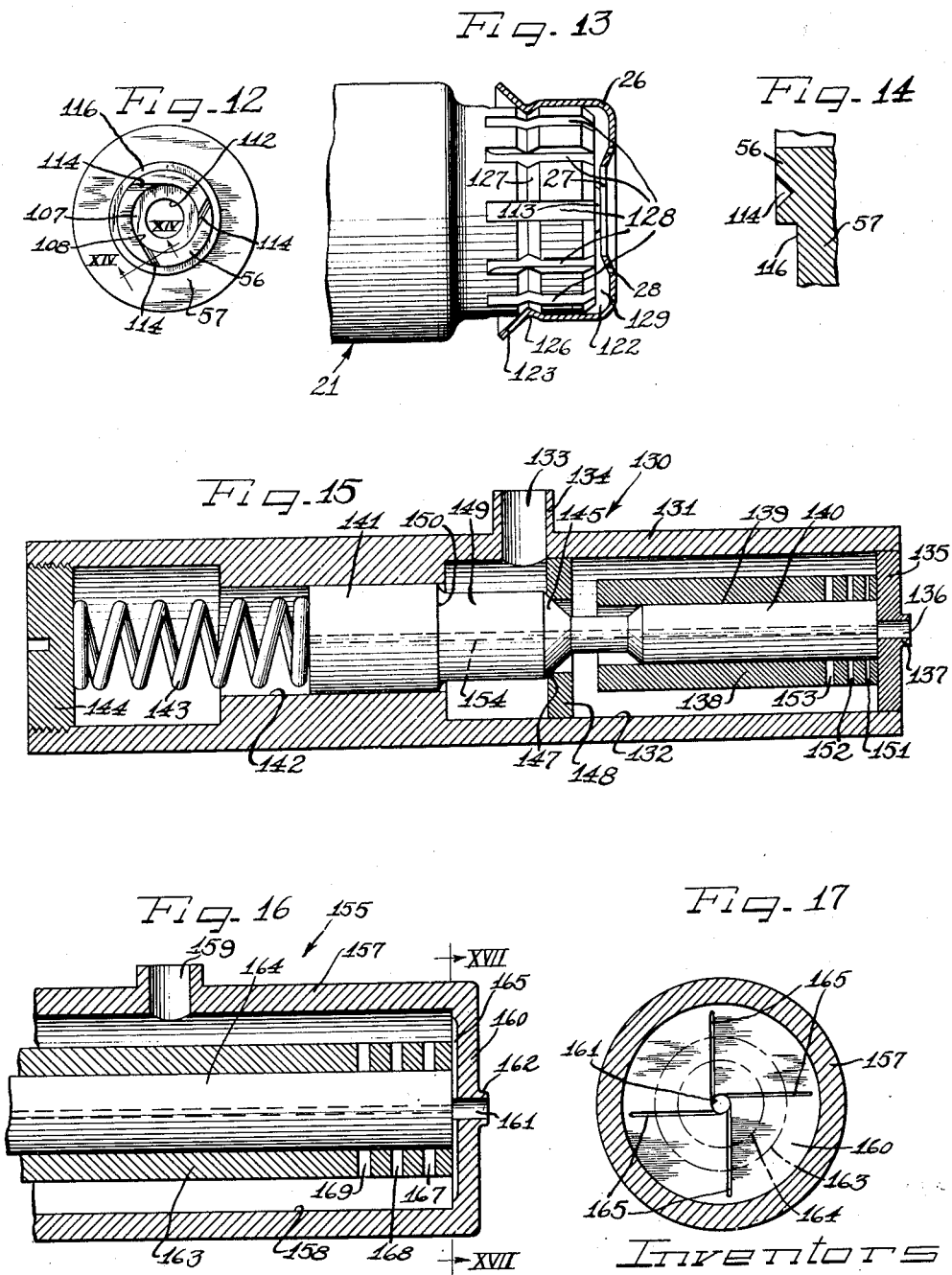

United States Patent Office 2,774,629
Patented Dec. 18, 1956

2,774,629

VARIABLE AREA FUEL NOZZLES

T Cyril Noon, Bainbridge Township, Geauga County, and Frank C. Bayer, East Cleveland, Ohio, assignors to Thompson Products, Inc., Cleveland, Ohio, a corporation of Ohio Application September 8, 1950, Serial No. 183,772

7 Claims. (Cl. 299—118)

The present invention relates to improvements in fuel nozzles and more particularly concerns variable area fuel nozzles of a type adapted for use in supplying a finely atomized spray of fuel to the burners of a gas turbine or jet engine such as may be used in aircraft.

Substantially uniformly fine atomization of the fuel supplied to the burners of a gas turbine or jet engine is highly important. The quality of atomization must not be less during periods of low fuel demand than in periods of low fuel demand than in periods of high fuel demand. In an ordinary fixed area nozzle, the fuel pressure is very low during low fuel demand and is excessively high during high fuel demands. This results in poor atomization at low fuel flows and satisfactory atomization only at the high fuel flows.

The present invention provides improved expedients for economically and efficiently accommodating the entire range of conditions which are encountered in the supply of finely atomized spray of fuel to the burners of a gas turbine or jet engine and which arise primarily due to variations in fuel demand and the consequent variations in the fuel supply volume.

An important object of the present invention is to provide for supplying finely atomized fuel in a spray having a substantially constant quality throughout a wide range of fuel supply volume, while maintaining the fuel pressure at a reasonably low value.

Another object of the invention is to provide an improved fuel atomizing nozzle of variable area and which is automatically adjustable as to area proportionate to the fuel supply pressure.

A further object of the invention is to provide a new and improved variable area fuel nozzle structure of simple and economical construction and highly efficient operation.

Still another object of the invention is to provide in a variable area fuel nozzle improved means to assure smooth and uniform operation.

Yet another object of the invention is to provide in an atomizing fuel nozzle improved means to assure that the spray will break clean from the discharge orifice.

A still further object of the invention is to provide, in an atomizing fuel nozzle, improved means for preventing carbonization about the discharge orifice.

Other objects, features and advantages of the present invention will be readily apparent from the following detailed description of certain preferred embodiments thereof taken in conjunction with the accompanying four sheets of drawings, in which:

Figure 5 is an enlarged longitudinal sectional view through the variable area fuel nozzle taken on substantially the line V—V of Figure 2;

Figure 6 is an enlarged developed view of the fuel port arrangement located about the swirl chamber of the nozzle structure;

Figure 7 is an enlarged side elevational view of the swirl chamber sleeve with its forward tip in section;

Figure 8 is a slightly reduced scale end elevational view of the exhaust chamber sleeve shown in Figure 7;

Figure 9 is a slightly reduced scale sectional view taken substantially along the line IX—IX of Figure 7;

Figure 10 is a slightly reduced scale sectional view taken substantially along the line X—X of Figure 7;

Figure 11 is a slightly reduced scale sectional view taken substantially along the line XI—XI of Figure 7;

Figure 12 is an inner face elevational view of the fuel nozzle discharge orifice plate;

Figure 13 is a fragmentary side elevational view of the forward end portion of the fuel nozzle showing an air shroud thereabout in section;

Figure 14 is a fragmentary detail sectional view taken substantially along the line XIV—XIV of Figure 12;

Figure 15 is a longitudinal sectional view of a modified form of the variable area fuel nozzle;

Figure 16 is a fragmentary longitudinal sectional view through a further modified form of the fuel nozzle; and Figure 17 is a sectional view taken substantially along the line XVII—XVII of Figure 16.

In producing a finely atomized spray having a definite shape when introducing fuel to the burners of a gas turbine or jet engine or the like, according to the present invention, the fluid fuel is forced under pressure from a fixed orifice or aperture of predetermined size and length, and immediately before the fluid enters the orifice a strong swirling motion is introduced therein. As a result a hollow and conically shaped spray pattern is created rather than merely a jet. This is accomplished by having the fluid enter tangentially into a cylindrical swirl chamber immediately upstream from the orifice so that the fluid is in rapid motion as a vortex about the axis of the orifice when it enters the orifice. The hollow cone is formed because each particle of fluid leaves the orifice with a tangential and an axial component of velocity.

In order to maintain the atomization quality of the hollow, conical spray pattern substantially constant throughout a large variable range of fuel demand, the volume and the peripheral area of the swirl chamber are varied in substantially direct ratio to the feul demand as evidenced by the fuel pressure. To this end, the peripheral area and the volume of the swirl chamber are increased in proportion to the pressure of the fuel supplied to the nozzle by lengthening of the swirl chamber, and at the same time the volume of fuel supplied to the swirl chamber is increased. As a result, the swirl rate, that is, the speed with which the fuel rotates in the swirl chamber, remains within a limited range throughout the variable fluid supply pressure range, and while the amount of fluid emitted from the spray orifice will vary accordingly and thus provide the proper fuel mixture as required, the hollow, conical spray pattern will persist throughout the variable range.

Figure 1:
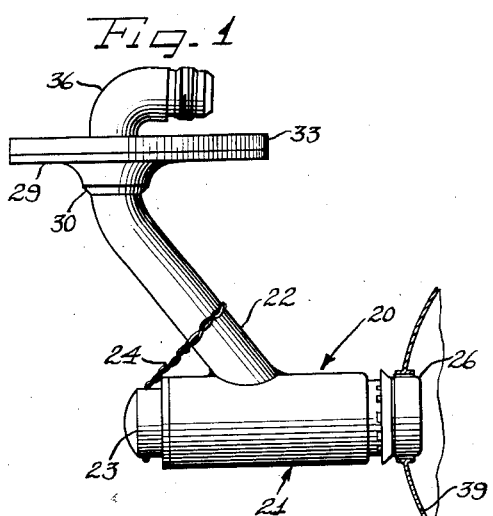
Figure 1 is a side elevational view of a fuel nozzle according to the present invention shown assembled with a fuel inlet nipple construction.
Figure 2:
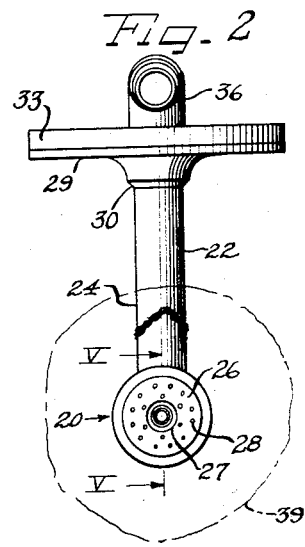
Figure 2 is an end elevational view of the fuel nozzle assembly and nipple construction of Figure 1.
Figure 3:
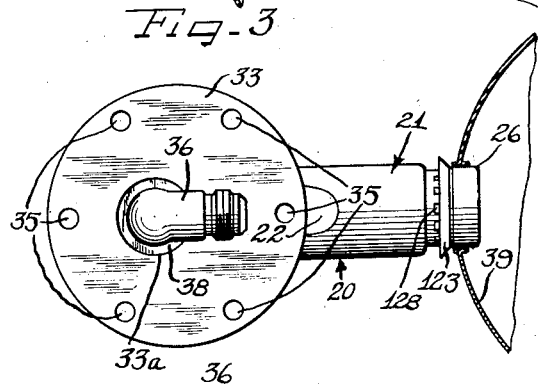
Figure 3 is a top plan view of the fuel nozzle and inlet nipple construction as shown in Figure 1.
Figure 4:
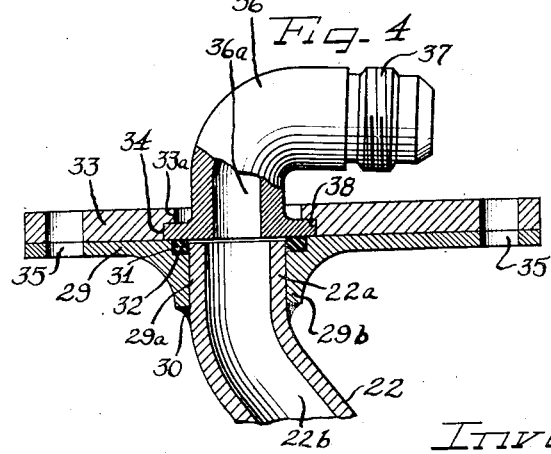
Figure 4 is an enlarged fragmentary side elevational view, partly in section, showing the fuel inlet nipple construction.

In a preferred form of variable area nozzle according to the present invention, as shown in Figures 1 to 14, inclusive, a variable area nozzle assembly 20 has a substantially cylindrical hollow body portion or member 21 with an integral fuel inlet pipe stem 22 formed integral therewith and leading therefrom intermediate its ends, shown in Figures 1, 2 and 5 as at the top thereof. At its rearward end the body 21 is closed by a cap 23 threadedly inserted therein. Inadvertent loosening of the cap 23 is prevented by means of a detachable safety wire 24 attached to the cap through a transverse bore 25 and extending around the fuel inlet pipe 22. The forward end of the body 21 is enclosed by an air shroud 26 having a relatively large opening 27 in the center of its front face and a plurality of relatively small holes 28 in the front face dispersed about the opening 27.

For the purpose of connecting with a liquid fuel supply source the fuel inlet pipe 22 extends upwardly and rearwardly from the body 21 and has an upper end portion 22a inserted into a mating hole 29a defined by a hollow boss or flange 29b on a flange plate 29 of circular plan form. The portion 22a is fixedly attached to the flange plate 29 by means of welding, brazing, or the like, designated as 30. The flange plate 29 has an annular rabbet groove 31 in its upper surface about the hole 29a. A sealing ring of resilient fluid-resistance material, such as O-ring 32, is disposed within the rabbet groove 31 about the upper terminal of the end portion 22a of the fuel inlet pipe 22.

A second flange plate 33 of circular plan form having a diameter substantially equal to that of the flange plate 29 has a surface complementary to and in coaxial opposing contacting engagement with the rabbet-grooved flat surface of the flange plate 29. The flange plate 33 has a hole 33a therethrough coaxial with the hole 29a in the flange plate 29 and defined at the interface surface of the flange plate 33 by an annular rabbet groove 34.

To afford a means for connecting the flange plates 29 and 33 in fixed relationship to one another and to a portion of a jet engine or the like (not shown), a plurality of coaxial holes 35 are formed about the peripheral sections of the flange plates. The holes 35 are adapted to receive connecting bolts or the like (not shown).

A substantially 90° elbow 36 having an externally threaded nipple 37 at one end thereof and an integral radially outwardly extending annular flange 38 at its other end is disposed with the annular flange 38 retainingly swiveled within the annular rabbet groove 34 in the flange plate 33. The axial thickness of the annular flange 38 is slightly greater than the axial depth of the annular groove 34, and hence is clamped in place when the flange plates 29 and 33 are held together in fixed relationship, the elbow 36 being thus retained against rotation in any predetermined angular setting of the elbow relative to the fuel nozzle assembly 20. In addition, a fuel-tight coupling between the elbow 36 and the fuel inlet pipe 22 is afforded by the O-ring 32 bearing against the lateral flange 38.

Liquid fuel is pumped through a connecting duct (not shown) which is attached to the nipple 37 of the elbow 36 and passes into an axial passageway 36a through the elbow 36 into a passageway 22b axially through the inlet pipe 22 and then into the body 21 of the fuel nozzle assembly 20. The fuel then passes through the nozzle assembly 20 in a manner to be described and emerges as a substantially conical spray into a combustion can or the like of a jet engine, depicted by the schematic fragment 39.

Referring now to Figure 5, the fuel traveling down the passageway 22b in the inlet pipe 22 enters an annular chamber 40 formed between a substantially cylindrical bore 41 in the body 21 and a substantially cylindrical piston sleeve 42 disposed in concentric relationship within the bore 41.

The piston sleeve 42 is retained in concentric relationship within the body 21 by means of annular flanges 43 and 44 at its forward and rearward ends, respectively, which bear radially and are in close-fitting contact with radially inwardly extending annular ridges 46 and 47 within the body portion 21 and are located in axially spaced relation for reception of the flanges 43 and 44, respectively, therein. Rearward axial movement of the piston sleeve 42 is prevented by the inner end of the cap 23 which is threadedly inserted into an internally threaded rearward end portion 49 of the body member 21. The cap 23 bears retainingly with its forward or inner end face 48 against the rearward end face of the piston sleeve 42. A radially outwardly extending annular flange 50 on the cap 23 opposes the rearward annular end of the threaded portion 49 of the body member 21.

In order to provide a fuel-tight seal between the rear end portion of the piston sleeve 42 and the radially adjacent annular ridge 47 within the body portion 21, an O-ring 42a of resilient fuel-resistant material is disposed in a radially outwardly facing annular rabbet groove 42b formed at the rearward terminal of the piston sleeve 42. The O-ring 42a is held in fluid fuel-sealing engagement with the groove 42b, the forward end of the cap 48 and the radially inward peripheral surface of the ridge 47.

The piston sleeve 42 is retained against forward axial movement within the body 21 by means of a plunger guide sleeve 51 having a short cylindrical rearward end portion 52 with a flat rearward face abutting axially an annular shoulder 53 of the sleeve 42. The shoulder 53 is formed at the rearward end of a forward enlarged diameter cylindrical chamber 54 formed coaxially in the piston sleeve 42.

The short cylindrical portion 52 of the plunger sleeve 51 fits snugly within the forward cylindrical chamber 54 within the piston sleeve 42 to retain said rearward cylindrical portion against radial movement. The forward portion of the plunger sleeve 51 is retained against forward axial movement and against radial movement by means of a short coaxial cylindrical cavity or recess 55 in its forward end within which is fitted a complementary annular rib 56 formed on the rearward face of an orifice plug or plate 57.

The orifice plate 57 has an annular forwardly, inwardly slanting beveled face 58 which abuts a rearwardly facing complementary beveled face 59 on an annular radially inwardly extending tapered flange 60 formed at the inner forward terminal portion of the body 21 at the mouth of a substantially cylindrical forward reduced diameter bore portion defining a chamber 61.

It is readily apparent that the orifice plate 57, the plunger sleeve 51, and the piston sleeve 42 can be easily removed from the body 21 by axially rearward movement of the parts after the threaded cap 23 has been removed.

Referring now to the coaction between the various elements included within body 21, means are provided for filtering of the fuel which enters into a substantially cylindrical piston chamber 62 formed coaxially within the piston sleeve 42. To this end a filter sleeve 63 of sintered bronze material of suitable porosity is wrapped about the outer surface of the piston sleeve 42 and is disposed at its axial ends within annular rabbet grooves 64 and 65 so that the radially outward surface of the filter sleeve 63 is substantially flush with the extreme radially outward surfaces of the piston sleeve 42.

In order to prevent pieces of the filter sleeve 63 which may become loosened from the main body of the filter from entering the piston chamber 62, an annular screen 66 is disposed radially inwardly and immediately adjacent to the radially inward surface of the filter 63 and rests with its axial ends in annular rabbet grooves 67 and 68 formed about the periphery of the piston sleeve 42.

Fuel which passes through the filter 63 and the screen 66 enters the piston chamber 62 through a plurality of ports 69 formed radially through the wall of the piston chamber 62 toward the forward end thereof. Thus, the fuel which enters the piston chamber 62 is well filtered and substantially free from all but inconsequential minute foreign particles.

Fuel pressure-sensitive fuel metering means are provided within the body 21. Herein such means comprise generally a pressure-responsive piston 70 slidable in the piston cylinder 62 and having a hollow stem 71 fixedly attached in coaxial relationship at one end to the piston 70 and at its other end to a plunger or fuel metering piston 72 slidably disposed within a coaxial plunger cylinder 73 within and extending through the plunger sleeve 51. The piston 70 is of generally cylindrical configuration with annular wiper grooves 70a around the outer surface of the forward end portion thereof to provide leak-proofing means. A forwardly open cylindrical chamber 74 within the piston 70 is closed at its rearward end by a transverse web 75 located near the rearward end of the piston. At the rearward face of the piston 70 is formed a cylindrical cavity or recess 76 which has an O-ring 77 of resilient material such as fuel-resistant synthetic rubber disposed therein adjacent the inner cylindrical surface thereof.

A check valve body 78 which is disposed within the piston cylinder 62 has a disk-like forward portion 79 which abuts, around the outer periphery of its front face, the annular rearward end of the piston 70. An integral cylindrical boss portion 80 extends axially forwardly from the front face of the valve body 78 and serves to retain the O-ring 77 against radially inward collapsing. The valve body 78 has an elongated cylindrical stem portion 81 extending axially from the rearward face thereof. A substantially cylindrical passageway 82 is formed axially through the valve body 78 and the stem portion 82 and terminates at its rearward end in a relatively short coaxial cylindrical passageway 83 of smaller diameter than the passageway 82, forming a valve seat shoulder 84 where the passageways meet.

For urging the piston 70 axially forwardly, a coil compression spring 86 is disposed in concentric relationship within a cylindrical chamber 87 formed as a cavity opening inwardly through the forward face of the cap 23. The chamber 87 terminates at its rear end in an integral forwardly centering boss 88 forming an annular groove 89 between its radially outward periphery and the radially inward periphery of the cylindrical chamber 87 and in which the rearward end of the coil spring 86 is disposed. The diameter of the cylindrical chamber 87 is no less than the diameter of the piston cylinder 62 received therein when it is forced rearwardly against the spring bias of the coil spring 86.

The forward end of the coil spring 86 is disposed within an annular rabbet groove 78a formed about the rearwardly facing outer periphery of the disc-like portion 79 of the valve body 78. Hence, the coil spring 86 exerts a forwardly directed force against the outer periphery of the valve body 78 which in turn transmits this force against the rearwardly directed annular face of the piston 70, urging the piston toward the forward end of the body 21.

The fixed attachment between the hollow stem 71 and the piston 70 is provided by a head 90 formed at the rearward end of the stem 71 which abuts the rearwardly directed face of the web 75 of the piston as the stem is inserted forwardly through a close-fitting hole 91 formed axially through the center of the web. A washer 92 is disposed about the stem 71 abutting the forwardly directed face of the web 75 and is fixedly attached to the stem by means of welding or brazing 93.

The plunger 72 has a relatively narrow axial passage 94 therethrough terminating in a short counterbored portion 96 at the rearward end thereof. The forward end portion of the stem 71 is inserted into the counterbored portion 96 and is fixedly attached therein by means of welding or brazing 97.

An important feature of the present invention resides in the above-described stem means of providing an integral attachment between the piston 70 and the plunger 72. The long, narrow stem 71 provides sufficient rigidity between the piston and the plunger to insure joint movement thereof, but at the same time is resiliently yieldable enough to accommodate slight eccentricity of one with respect to the other without any binding action occurring. Hence, the manufacturing tolerances as to concentricity between the piston 70 and the plunger 72 are substantially eased which greatly increases the ease of mass production manufacture and assembly of the entire nozzle assembly.

The plunger 72 has an integral head 98 formed at its rearward end which abuts the rearwardly directed face of the plunger sleeve 51 when the plunger 72 is in full forward position. Hence, forward travel of the piston 70 due to the bias of the coil spring 86 is positively limited by means of the aforesaid head 98 on the plunger 72 through the stem 71 which is fixedly attached to both the cylinder and the plunger.

Referring now to delivery of fuel from the annular chamber 40 through the body portion 21 to the combustion can 39, fuel passes from the chamber 40 through an annular screen 99 about the forward end portion of the piston sleeve 42, which screen serves to keep relatively large pieces of foreign matter from passing through the nozzle discharge means. After passing through the screen 99, the fuel passes through a plurality of ports 100 located about the periphery of the forward portion of the piston sleeve 42 into segmental cylindrical chambers 101 which join at their forward ends an axially narrow substantially annular chamber 102 which in turn joins a second substantially annular chamber 103 extending forwardly to the orifice plate 57.

As seen in Figures 5 and 7 to 11, inclusive, the plunger sleeve 51 has an after body portion 104 which is integrally attached to the disc-like cylindrical portion 52 at the rearward end of the plunger sleeve. The after body portion 104 is of generally triangular cross section having blunt points terminating in arcuate surfaces 105 which are included in the cylindrical plane defined by the peripheral surface of the disc-like cylindrical portion 52. Hence, the arcuate surfaces 105 contact the inner peripheral wall of the forward cylindrical chamber 54 within the piston sleeve 42 and are in complementary contact therewith, thus forming the segmental cylindrical chambers 101 between the piston sleeve 42 and the plunger sleeve 51. An integral portion 106 of the plunger sleeve 51 is of substantially hexagonal cross section having the distance between opposite points smaller than the diameter of the cylindrical chamber 61 in the body portion 21 and therefore forming the substantially annular chambers 102 and 103 between the plunger sleeve 51 and the body 21.

The plunger 72 extends for substantially the entire length of the plunger cylinder 73, closing the same when the head 98 bears against the rearward end of the plunger sleeve 51. Formed in the rearward face of the orifice plate 57 is a cylindrical cavity 108 of the same diameter as the plunger cylinder 73 through the plunger sleeve 51 and forming substantially a continuation of said cylinder. The cylindrical chamber formed between the rearward facing surface of the cylindrical recess or cavity 108 and the forward facing surface at the forward end of the plunger 72 will be referred to as the swirl chamber, designated by the reference numeral 109.

Means are provided for varying the port inlet area into the swirl chamber 109 in accordance with the pressure of the fluid fuel introduced into the body 21. Herein such means comprise the piston assembly including the piston 70, the stem 71, and the plunger 72, in conjunction with the coil spring 86, and a longitudinal series of peripheral passageways 111 communicating between the annular chamber 103 and the plunger cylinder 73 and formed through the plunger sleeve 51. As the pressure of the incoming fluid increases, the fluid pressure within the piston chamber 62 will act upon the piston 70 to force the piston assembly rearwardly against the bias of the coil spring 86 which action will move the forward face of the plunger 72 rearwardly, increasing the volume and peripheral area of the swirl chamber 109 and opening some of the forwardly disposed ports 111. Thus, it can be seen that further increase in the fuel inlet pressure will move the piston assembly further rearwardly, consequently opening more of the ports 111 and allowing more fuel to enter the swirl chamber 109 because of the additional number of ports thus opened.

In order to provide for a smooth and even increase in open port area and to allow for a large differential in flow between minimum and maximum, the ports 111 are dispersed fairly evenly about the periphery of the forward portion 106 of the plunger sleeve 51 and are graduated in size axially with the smaller ports being located close to the orifice plate 57 and the larger ports being located axially rearwardly at a greater distance from the orifice plate. Therefore, as the plunger 72 moves rearwardly uncovering more of the ports 111, the port inlet area into the swirl chamber 109 is increased both due to the increase in the number of ports communicating therewith and due to the increase in area of the later uncovered ports.

A layout of the ports 111 which has been found to be satisfactory in practice is illustrated in the developed view shown in Figure 6 in which all six faces of the end section of the forward portion 106 are visible and which shows schematically a practical application of the port inlet area increasing means discussed above. It is to be understood that many different port patterns can be utilized and that the present invention is not limited to the specific layout shown.

In order to provide for even distribution and a conical spray, the inlet ports 111 are formed to discharge substantially tangentially into the swirl chamber in relation to the cylindrical periphery thereof. All of the inlet ports 111 are arranged to whirl the fluid into the swirl chamber 109 in the same direction, hence forming a rapidly spinning vortex within the swirl chamber. This tangential entrance feature can best be seen in Figures 9 to 11 which are sectional views taken transversely through three axially different sections of the plunger sleeve 51 in the area of the inlet ports 111.

Thorough atomization of the fuel is insured during the entire flow range due to the increase in volume and peripheral area of the swirl chamber as the plunger 72 moves rearwardly in response to increased fluid inlet pressure. As a result of this increased volume and peripheral area of the swirl chamber, the whirling velocity of the fluid within the chamber is not greatly increased over the entire flow range, and consequently the degree of atomization at minimum flow is substantially equal to that obtained at maximum flow.

The fuel is discharged from the body 21 through a circular orifice 112 formed axially through the center of the orifice plate 57. The orifice 112 is of a preferred predetermined diameter and length. In order to insure that the spray stream from the orifice 112 will break clean and not tend to run along the base of the orifice plate 57 due to adhesion, a thin lip or extension 113 is provided to project forwardly from the orifice plate 57 about the mouth of the orifice 112.

An annular cavity or recess 57a is provided in the front face of the orifice plate 57 about the lip 113 with the radially outer perimeter thereof adjacent to the edge defining the opening 27.

Due to the violent whirling of the fuel within the swirl chamber 109, the spray pattern from the orifice 112 is of conical shape as desired. In addition, the lip or extension 113 about the orifice 112 forces the fluid to break away from the surface of the orifice plate 57 to form a more distinct spray cone.

Means are provided to insure a minimum flow of fuel from the orifice 112 when the fuel inlet pressure is of such a low value that the piston assembly is pushed forward by the biasing action of the coil spring 86, closing off all of the ports 111. To this end, a plurality of minimum flow fluid delivery bleed or metering grooves 114 (Figures 12 and 14) of triangular cross-section are formed along the axially inwardmost face of the orifice plate 57 and are arranged to direct fluid tangentially into the swirl chamber 109 to whirl in the same direction as the fluid introduced through the ports 111. The grooves 114 communicate at their radially outward ends with an annular rabbet groove 116 formed about the radially outward edge of the face in which the grooves themselves are formed. When the annular rib 56 of the orifice plate 57 is assembled in complementary relationship within the cylindrical cavity 55 formed in the forward end of the plunger sleeve 51, the annular rabbet groove 116 forms an annular supply channel which communicates with the annular chamber 103 by means of a pair of rectangular notches 117 (Figures 8 and 7) formed through the wall of the cylindrical cavity 55 at diametrically opposed positions.

Thus, it can be readily seen that when the fluid inlet pressure is sufficiently low that the piston assembly 110 is in full forward position, a relatively small amount of fluid fuel will still be injected tangentially into the swirl chamber 109 from the annular chamber 103 through the rectangular notches 117 into the annular rabbet groove 116 and then through the triangular grooves 114 into the chamber.

In order to prevent substantial leakage from the piston chamber 62 into the swirl chamber 109, a pair of annular grooves 118 are formed around the periphery of the plunger 72 toward the rearward end thereof.

In order to provide a leakage path for fluid which may seep into the cylindrical spring chamber 87 and to provide a pressure relief passage for maintaining the pressure therein substantially equal to the pressure in the swirl chamber, a passageway 119 is provided from the cylindrical spring spring chamber 87 to the swirl chamber 109. The passageway 119 is formed by the cylindrical passageways 82 and 83 through the valve body 78, the passageway 71a through the hollow stem 71, and the passageway 94 axially through the plunger 51.

For preventing leakage flow from the cylindrical chamber 87 into the swirl chamber 109 during the minimum flow condition in order to prevent interference with the conical spray pattern during this flow condition, a check valve system is provided within the valve body 78. Herein the check valve system comprises a spherical ball 120 of slightly smaller diameter than that of the cylindrical chamber 82 but of greater diameter than that of the port or passageway 83, which ball is urged against the shoulder 84 within the valve body 78 by means of a coil compression spring 121 disposed between the spherical ball 120 and the head 90 formed at the rearward end of the stem 71. The spring 121 is of such a strength that the spherical ball 120 will remain seated during the minimum fuel flow condition but will become unseated and allow leakage flow to pass by it through the passageway 119 into the swirl chamber 109 during any flow condition greater than minimum. Hence, a leakage venting or bleed system is provided for the cylindrical chamber 87 and at the same time the possible leakage flow is not allowed to disrupt the flow pattern during the minimum flow condition. In addition, the spherical ball will positively prevent any possible reverse flow through the leakage passage 119.

Means are provided for preventing build-up of carbon deposits on the forward face of the orifice plate about the discharge orifice, which deposits would tend to restrict the discharge orifice and to disrupt the conical spray pattern. In the present instance such means comprise the cup or air shroud 26 which enshrouds the forward reduced diameter end portion of the nozzle body 21 and defines an air path 122 leading forwardly then radially inwardly to be directed in the sheet-like form about the periphery of the orifice lip 133 in order to sweep the same clean of stray droplets of fuel which would otherwise leave deposits of carbon thereon.

The air shroud 26 may be formed from sheet metal having resilient characteristics and is generally cup-shaped, having a radially outwardly and axially rearwardly directed flaring air scoop or deflecting bell-mouth flange 123 about its rearward periphery and defining an annular inlet 124 between said flange and the adjacent outer periphery of the reduced diameter forward portion of the body 21.

It will be noted that the scoop flange 123 is spaced some distance forwardly from the shoulder located at the juncture of the reduced diameter tip portion of the body 21.

In order to be retained about the end portion of body 21, the air shroud 26 has an annular indentation or rib 126 therearound which is adapted to be snapped into substantially nested retaining relation in an annular V-shaped groove 127 formed about the outer periphery of the forward section of the body 21.

A plurality of channels 128 of U-shaped cross-section are formed longitudinally along the outer surface of the forward section of the body 21 and are located in spaced relation about the periphery thereof. The channels 128 are deeper than the groove 127 and serve as connecting passageways between the annular inlet 124 and a narrow disk-like chamber 129 formed between the forward end of the nozzle body 21 and the forward portion of the air shroud 26, the channels 128 and the disk-like chamber 129 forming the section of the air path 122 enclosed between the air shroud 26 and the body portion 21.

For substantially increasing the velocity of the air as it is discharged from the disc-like chamber 129 in order to further insure a carbon-free area about the orifice 112, a reduced flow area Venturi-like discharge passage portion 129a is formed between the orifice plate 57 and a diagonally radially inwardly directed marginal flange 26a formed about the opening 27 through the shroud 26. Thus, the velocity of the air is increased due to the Venturi-like form and action of the discharge portion 129a.

In addition to its Venturi-forming function, the inwardly directed marginal flange 26a has another important advantage. It approaches relatively close to the lip 113, but due to the inset position of the edge defining the opening 27, adequate clearance from the jet spray cone is afforded in order not to disrupt the spray pattern. The air rushing thereby keeps the edge defining the opening 27 free from carbon deposits.

For insuring a smooth flow of air about the lip 113 to prevent disruption of the fuel spray cone and for insuring a complete wiping action of the air stream, the annular recess 57a is contoured to direct the air stream discharged from the Venturi-like portion 129a smoothly about the base and along the periphery of the lip.

In order to keep the forwardly directed face of the shroud 26 free from carbon deposits, the holes 28 through said face provide a plurality of air jets directed axially outwardly through the holes from the disc-like chamber 129. The jets fan radially outwardly as they leave the holes 28 and thus prevent stray droplets of fuel from contacting the surface of the shroud and carbonizing thereon.

The air shroud 26, during operation of the nozzle assembly 20, serves as a simple injector and ejector shroud for directing a peripheral flow of air in substantially sheet-like form about the nozzle orifice 112 and thereby serves to prevent stray droplets of discharged fuel from coming in contact with the forward surface of the orifice plate 57 and hence burning on said surface to leave a carbon deposit. It will be understood that the flow of air through the path 122 is partly a secondary ejector flow induced by the primary conical spray which entraps air adjacent its periphery during mixing therewith and is partly an injector flow induced by air flow from the jet engine compressor, some of which will enter the flared entrance 124.

In operation of the variable area nozzle construction described hereinabove, fuel enters the nozzle body through the inlet passageway 22b into the annular chamber 40 and then flows through the ports 100 and the segmental cylindrical chambers 101 into the annular chamber 103 about the swirl chamber inlet ports 111.

At the same time a sufficient amount of fuel to fill the piston chamber 62 enters therein through the filter 63 and through the piston chamber ports 69. Until the fuel pressure within the piston chamber 62 attains a value sufficient to overcome the spring bias on the piston 70 to move the piston assembly 110 enough to uncover the forwardmost of the inlet ports 111, minimum fuel flow into the swirl chamber 109 and out the orifice 112 is attained through the tangential grooves 114. As the fuel inlet pressure is increased, the first of the ports 111 are uncovered which allows additional fuel to enter the now enlarged swirl chamber to swirl about the periphery thereof and to be discharged in a conical form spray through the orifice 112. Further increase in the fuel inlet pressure will serve to uncover more of the ports 111 to allow more fuel into the consequently increased volume of the swirl chamber to be swirled about the periphery thereof and consequently discharged through the orifice.

Therefore, the inlet port area into the swirl chamber and the peripheral area and volume of the swirl chamber itself are all increased in substantially direct proportion to the fuel inlet pressure, thus allowing for a large range of fuel flow while still providing a substantially continuous quality of atomization of the discharged fuel over the entire flow range.

During this operation, except for the minimum flow condition, venting of the cylindrical spring chamber 87 is accomplished through the vent passage 119 into the swirl chamber 109 in order to keep the chamber 87 at the same pressure level as the swirl chamber. Reverse flow through the vent passage 119 is prevented by the spherical ball check 120 which, in combination with coil springs 121, also prevents venting of the chamber 87 during the minimum flow condition in order to prevent disruption of the conical spray pattern during this flow operation.

In addition, during the entire flow range, a stream of air is directed about the periphery of the orifice 112 to prevent carbonization of stray droplets of fuel on the forward surface of the orifice plate which might build up and tend to disrupt the flow pattern or restrict the orifice. The flow in the stream of air thus directed will vary in direct relation to the fuel flow.

In the modification of Figure 15, a nozzle assembly 130 is shown including an elongated hollow body or casing member 131 within the forward portion of which is a relatively large diameter bore 132 providing a fluid chamber into which leads an inlet port 133 from one side of the casing or housing and defined by an inlet boss 134. At its forward end, the chamber 132 is closed by an orifice plate 135 having an axial orifice 136 defined by a protruding lip 137.

The chamber 132 is of larger diameter than a sleeve member 138 which is mounted on the inner face of the orifice plate 135 and has a bore 139 concentrically related to the orifice 136 and of larger diameter. Within the bore 139 is a fuel metering piston or plunger 140. At its rear end, the plunger 140 is provided with an enlarged diameter portion 141 which is slidably guided as a piston in a reduced diameter section 142 of the housing bore. Biasing means, such as a coiled compression spring 143, bears against the rear end of the piston portion 141 and is in engagement at its other end with a closure plug 144 which closes the rear end of the body bore. The plug 144 is adjustably threaded into the body bore so as to adjust the tension of the spring 143.

In its orifice sealing position under the influence of the biasing spring 143, the plunger 140 has an intermediate generally frusto-conical, poppet valve portion 145 sealingly seated against a valve seat 147 provided by a ported barrier plate 148 disposed intermediate the inlet 133 and the rear end of the plunger guide sleeve 138. Rearwardly of the valve portion 145 the plunger has a cylindrical portion of intermediate diameter identified at 149 and which merges with the cylindrical piston portion 141 on an annular forwardly facing shoulder 150.

In the operation of the form of Figure 15, fluid entering through the inlet 133 is trapped in the chamber between the barrier wall 148 and the opposing shoulder at the mouth of the reduced diameter bore portion 142 and the piston shoulder 150. When the pressure of the fluid is greater than the pressure exerted by the biasing spring 143 the piston portion 141 is moved rearwardly and thus causes the valve portion 145 to leave the valve seat 147 whereby to crack the valve and at the same time the plunger 140 moves away from the entrance to the orifice 136.

The fluid escaping past the valve seat 147 into the bore chamber 132 is delivered by way of radial or tangential ports 151 of relatively small diameter and thus small aggregate cross-sectional flow area adjacent the forward end of the sleeve 138 into the forward swirl chamber portion of the sleeve bore 139 where, similarly as in the swirl chamber 109 (Figure 5), the fluid swirls with sufficient acceleration to travel in a vortex flow to exit through the orifice 136 from which it is emitted as a hollow cone-shaped atomized spray stream. Greater pressure of the fluid entering the nozzle assembly further unseats the plunger 140 until a series of ports 152 of larger diameter is uncovered to afford increased fluid volume in the increased volume and peripheral area of the swirl chamber. Still further opening movement of the plunger 140 uncovers a series of ports 153 disposed successively after the ports 152 and of larger individual diameter and aggregate cross-sectional area and further increasing the volume of fluid entering the greatly increased area of the swirl chamber portion of the bore 139.

Pressure relief for the chamber area behind the plunger piston 140 within which the biasing spring 143 is operative is afforded by way of a relief bore 154 of relatively small diameter extending through the axis of the plunger 140 and affording a passage from the rear end through the forward end of the plunger and in operation venting into the rear part of the swirl chamber which, due to the vortex flow existing therein, does not fill up toward the rear and thus affords a clear vent passage.

While the form of the invention shown in Figure 15 provides for sealing off the spray orifice, both at the orifice and at a point between the inlet into the nozzle and the orifice, certain conditions may require that there be a constant minimum flow passage between the fluid chamber within the nozzle and the orifice. For this purpose the form of the invention shown in Figures 16 and 17 may be desirable. In this form, a nozzle assembly 155 including a tubular housing or casing 157 providing an enlarged fluid chamber 158 has an inlet 159 for delivery of fluid into the chamber 158 and an end closure 160 with an axial discharge orifice 161 defined by a protruding annular lip 162. A sleeve 163 of smaller external diameter than the internal diameter of the chamber 158 abuts the closure wall 160 and affords a sliding guide for a reciprocable fluid control plunger or piston 164. Appropriate biasing means which may be of either of the forms shown in Figures 5 or 15, or any other appropriate arrangement, normally maintains the forward end or tip of the plunger 164 in abutment with the inner face of the closure wall 160 about the entrance to the orifice 161.

In order to by-pass the forward tip of the sleeve 163 for minimum fluid delivery from the chamber 158 to the orifice 161, the inner face of the closure wall 160 is formed with a set of shallow inwardly radially extending fluid delivery grooves 165 herein shown as four in number (Figure 17) and extending tangentially to the orifice 161. The grooves 165 extend from beyond the periphery of the tip of the sleeve 163 and thus affords constant communication of small aggregate flow area between the chamber 158 and the orifice 161 so that fluid will be delivered to the orifice 161 even though pressure may not be great enough to unseat the plunger 164 to open communication between the chamber 158 and a swirl chamber within the forward end portion of the sleeve 163 by way of a set of radial or tangential ports 167 opening through the sleeve. By preference the ports 167 are of substantially larger aggregate flow area than the grooves 165. As the pressure increases, the plunger 164 is unseated further until a second series of ports 168 in the sleeve 163 is uncovered. A further increase in pressure may drive the plunger 164 open to the extent that a final set of ports 169 will be open as the volume and peripheral area of the swirl chamber increases. Through this arrangement a swirling supply of fluid is delivered to the orifice 161 as long as there is any fluid pressure within the nozzle and it is not necessary that a predetermined pressure build up within the nozzle before fluid is delivered as a spray from the nozzle. As the pressure increases, the peripheral swirl area for the orifice 161 increases proportionally as does also the volume of fluid delivered to and through the orifice.

It will be understood that modifications and variations may be effected without departing from the scope of the novel concepts of the present invention.

I claim as my invention:

1. In combination in a nozzle assembly adapted for use with a gas turbine or jet engine or the like, a casing having an end portion containing a fixed spray orifice adapted to discharge a finely atomized hollow cone-shaped spray to the burner of the engine, said end portion having a pullraity of channels formed longitudinally forward along the outer surface of the forward portion and located in spaced relation about the periphery thereof, said end portion having an annular groove formed about the periphery thereof and intersecting said longitudinal channels, a cup-shaped shroud of sheet material having an annular radially inwardly directed rib therearound, said rib being retainingly engaged within said annular groove for holding said shroud over said end portion with a relatively narrow space between the end of said shroud and the end of said end portion, said shroud having a circular aperture formed through the center of its end, said aperture being of greater diameter than said orifice, said channels, said space, and said aperture forming a continuous passageway for directing a stream of air about said orifice to retain the radially outward edge of the atomized hollow cone-shaped spray in substantially non-disintegrating condition.

2. In combination in a nozzle structure of the character described, means defining a fixed orifice, means providing a swirl chamber immediately upstream from the orifice, means for delivering fluid to the swirl chamber, and a reciprocable delivery control member operable responsive to fluid pressure within the nozzle for varying the volume of fluid delivered to the swirl chamber, said reciprocable member comprising an elongated cylindrical plunger having a relatively narrow axial passage therethrough, a relatively thin elongated stem having a relatively narrow axial passage therethrough, a cylindrical piston of greater diameter than said plunger having an axial hole therethrough adapted to receive one end of said stem, said stem having one end fixedly attached within the hole in said piston in concentric relationship therewith and having its other end fixedly attached within the passageway through said plunger, the passageways through the plunger and the stem affording a vent from the outer end of said plunger to the opposite end of said piston, check valve means for controlling flow through said vent, said stem providing a sufficiently rigid connection between the piston and the plunger to insure concurrent axial movement therebetween but at the same time affording a limited eccentricity of one with respect to the other without causing binding of said reciprocable member within said nozzle.

3. In combination in a nozzle construction of the character described, a casing, means for delivering fluid to said casing comprising a substantially right angular tubular elbow having a threaded nipple at one end thereof and an annular radially outwardly directed flange at the other end, a circular flange plate having a circular opening therethrough and an annular rabbet groove formed in one face of said plate about said opening, said elbow extending through said opening with said annular flange disposed in complementary relationship within said annular rabbet groove, a second circular flange plate of equal diameter to said first flange plate and having one face in abutting contact with the grooved face of said first flange plate, said second flange plate having a circular aperture therethrough coaxial with the opening through said first flange plate and having an annular groove about said aperture on the inner face of said second flange plate, said aperture having an annular boss therearound integrally formed with said flange plate, a tubular member held with one end in a fixed telescoping relationship within said aperture, the one end extending in opposed relation to said annular groove about the aperture of said second plate, a sealing ring of resilient material disposed in said annular groove about said aperture on the inner face of said second flange plate and contacting said one end of said tubular member for effecting a fluid-tight seal between the flanged end of said elbow and said tubular member, said tubular member having its other end integrally attached to said casing, and means for holding said flange plates in face to face abutting contact to prevent pivoting of said elbow with respect to said casing.

4. In combination in a nozzle construction of the character described, a tubular nozzle casing having a fixed orifice at the forward end of said casing, a first intermediate sleeve defining with said casing a radially outer intermediate fuel inlet chamber, a second forward sleeve defining with said casing a forward radially outer chamber, said second forward sleeve having a bore terminating in closely spaced relation and axial with said orifice, reciprocable means controlling the flow of fluid from said casing out of said orifice including a part reciprocable within the bore of said second forward sleeve, and a piston reciprocably mounted within said first intermediate sleeve and defining with the rear end of said second forward sleeve and with the first intermediate sleeve a radially inner actuating chamber for said piston, said first intermediate sleeve having ports therethrough affording communication between the radially outer intermediate fuel inlet chamber and said radially inner actuating chamber, means including a sintered bronze filter and a wire screen downstream of said filter and in surrounding relation to said first intermediate sleeve for filtering the fluid entering said radially inner actuating chamber from said radially outer intermediate fuel inlet chamber through said first intermediate sleeve ports, said filter acting to prevent particles of foreign matter from entering said actuating chamber, said screen acting to prevent attached pieces of said filter from entering said actuating chamber.

5. In combination in a nozzle construction of the character described, a nozzle casing having a fixed orifice at one end thereof, a first intermediate sleeve disposed within an intermediate portion of said casing to define with said casing an annular fluid inlet chamber, a second forward sleeve telescoping within the forward portion of said first sleeve and substantially concentric with and disposed upstream immediately adjacent to the orifice, said second forward sleeve comprising an elongated portion of substantially hexagonal cross section disposed at the forward end of the second forward sleeve adjacent said orifice and extending in spaced relation to the forward portion of said casing, a portion of generally triangular cross section integrally attached behind said hexagonal portion, said triangular portion having its apexes contacting the walls of said first intermediate sleeve to form segmental cylindrical passages therebetween, and a short cylindrical portion behind said triangular portion and integrally attached thereto and in close fitting relation to said first intermediate sleeve, said first intermediate sleeve having ports affording communication between said fluid inlet intermediate chamber and said segmental cylindrical passages, and means affording communication between the space between said forward end of the casing and the hexagonal portion of said second sleeve and said orifice.

6. In a nozzle having an inlet and an outlet, means defining a chamber communicating at one end with said inlet and at the other end with said outlet, piston means slidable in said chamber, metering means operated by said piston means for providing increased flow with increased inlet pressure, and check valve means for preventing flow from said outlet to said other end of said chamber while allowing flow in the reverse direction to permit free movement of said piston means in response to increased inlet pressure.

7. In combination in a nozzle construction of the character described, means defining a fixed orifice, means providing an outlet chamber immediately upstream from said orifice, means defining a fluid inlet, means for delivering fluid to said outlet chamber from said fluid inlet, an actuating chamber separate from and independent of said outlet chamber, means affording communication between said actuating chamber and said fluid inlet, a reciprocable delivery control member operable responsive to fluid pressure within the actuating chamber for varying the volume of fluid delivered to said outlet chamber, said reciprocable member being urged in a direction to deliver an increased volume of fluid by fluid pressure in said actuating chamber, biasing means disposed adjacent one end of said reciprocable member for urging said member in a direction to decrease the volume of fluid delivered to said outlet chamber, a vent passageway through said reciprocable member between said outlet chamber and said biasing means chamber, and check valve means located adjacent said biasing means chamber and of said vent passageway for controlling vent flow through said passageway.

References Cited in the file of this patent

UNITED STATES PATENTS

| 391,865 | Schutte | Oct. 30, 1888 |
| 808,457 | Kraver | Dec. 26, 1905 |
| 1,020,839 | Niesen | Mar. 19, 1912 |
| 1,073,936 | Schorr | Sept. 23, 1913 |
| 1,202,051 | Gibbons | Oct. 24, 1916 |
| 1,363,703 | Zimmermann | Dec. 28, 1920 |
| 1,840,863 | Wenderhold | Jan. 12, 1932 |
| 2,015,611 | Wettstein | Sept. 24, 1935 |
| 2,204,451 | Schoenwetter | June 11, 1940 |
| 2,289,675 | Ofeldt | July 14, 1942 |
| 2,321,559 | Klockau | Mar. 2, 1943 |
| 2,325,495 | Ferguson | July 17, 1943 |
| 2,399,182 | Gustafsson | Apr. 30, 1946 |
| 2,548,904 | Neal et al. | Apr. 17, 1951 |
| 2,656,218 | Campbell | Oct. 20, 1953 |

FOREIGN PATENTS

| 415,274 | Great Britain | Aug. 23, 1934 |
| 581,367 | Great Britain | Oct. 10, 1946 |

OTHER REFERENCES

Serial No. 330,226, Anxionnaz (A. P. C.), published May 25, 1943.